United States Patent [19]

Klaassen et al.

[11] Patent Number: 5,130,866
[45] Date of Patent: Jul. 14, 1992

[54] METHOD AND CIRCUITRY FOR IN-SITU MEASUREMENT OF TRANSDUCER/RECORDING MEDIUM CLEARANCE AND TRANSDUCER MAGNETIC INSTABILITY

[75] Inventors: Klaas B. Klaassen; Jacobus C. Leonandus van Peppen, both of San Jose, Calif.

[73] Assignee: International Business Machines Corporation, Armonk, N.Y.

[21] Appl. No.: 554,049

[22] Filed: Jul. 17, 1990

[51] Int. Cl.$^5$ ............................ G11B 5/60; G11B 7/12; G01B 7/14; G01R 33/12

[52] U.S. Cl. .......................................... 360/75; 360/31; 360/55; 360/103; 360/71; 360/110; 369/53; 324/207.11; 324/207.22; 324/212

[58] Field of Search ........................ 360/31, 55, 71, 75, 360/103, 110; 369/53, 58; 324/206, 207.11, 207.22, 210, 212

[56] References Cited

U.S. PATENT DOCUMENTS

| | | | |
|---|---|---|---|
| 3,686,682 | 8/1972 | Behr et al. | 340/174.1 B |
| 4,777,544 | 10/1988 | Brown et al. | 360/75 |
| 4,841,389 | 6/1989 | Hoyt et al. | 360/75 |
| 4,872,071 | 10/1989 | Easton et al. | 360/31 |

OTHER PUBLICATIONS

R. L. Wallace, Jr., "The Reproduction of Magnetically Recorded Signals", Oct. 1951 The Bell System Technical Journal, vol. 30, pp. 1145–1173.

Primary Examiner—Aristotelis Psitos
Assistant Examiner—David L. Robertson
Attorney, Agent, or Firm—Henry E. Otto

[57] ABSTRACT

A method and circuitry are described for sensing the clearance between a magnetic transducer and a moving magnetic recording medium in a magnetic disk or tape storage system or alternatively sensing the degree of magnetic instability of a magnetic transducer in such a system. Magnetic transitions prewritten on a preselected area of the medium are read to obtain a readback signal. The width of said signal is sensed at a predetermined amplitude level which is a preselected percentage of its base-to-peak amplitude to provide a voltage corresponding to the width of said signal at said level. The voltage is proportional to the width of the readback signal divided by the time period between successive transitions of identical polarity, so as to provide a measurement of clearance of degree of magnetic instability that is independent of the relative velocity between said transducer and medium.

The voltage is digitized and compared to a prestored digital reference value. If the clearance is not within a preestablished acceptable range, a desired control operation is initiated, such as stopping movement of the medium. The preselected percentage can vary between 10% and 90%. However, when measuring transducer-medium clearance the percentage is preferably 45%–55%; whereas when measuring degree of instability, the percentage is preferably 30%–35%.

28 Claims, 3 Drawing Sheets

READBACK DATA SIGNAL V(t)

PULSE WAVE SIGNAL Vc(t)

TIME-AVERAGED OUTPUT SIGNAL Vavg

METHOD AND CIRCUITRY FOR IN-SITU MEASUREMENT OF TRANSDUCER/RECORDING MEDIUM CLEARANCE AND TRANSDUCER MAGNETIC INSTABILITY

This invention relates to a method and circuitry for measuring transducer-to-medium clearance or flyheight between a magnetic transducer or head as it "flies" above the surface of a moving magnetic recording medium and/or for measuring the magnetic instability of the transducer. The invention relates more particularly to a method and circuitry wherein a voltage corresponding to the pulse width of a data readback signal sensed at a predetermined fraction of its peak amplitude is compared with a prestored reference value (a) for diagnostic purposes, (b) to indicate an impending crash of the transducer with the medium, and/or (c) to denote instability of the transducer.

BACKGROUND OF THE INVENTION

As the storage capacity of magnetic recording disks is increased by reducing track width and transducing gaps, the heads must fly closer and closer to the recording surface in order to maintain adequate signal strength. If the head contacts the recording surface while the disk is moving, the resultant "head crash" can wipe out previously recorded data, damage the recording surface, and/or the slider on which the head is mounted.

The effect of head/media spacing on the amplitude of magnetic readback signals is described by R. L. Wallace, Jr. in "The Reproduction of Magnetically Recorded Signals", The Bell System Technical Journal, Vol. 30, October 1951, pp. 1145-1173. This publication includes the "Wallace equation" which expresses the dependence of readback voltage on various recording parameters including head/disk spacing.

U.S. Pat. No. 3,686,682 describes a method and apparatus wherein a test signal consisting of pairs of positive and negative-going pulses is recorded on a selected track of a recording disk. The time interval between the peaks of the pulses of each pair is measured. The number of pulse pairs whose spacing varies a predetermined amount relative to the normal pulse spacing, and also the number of pulses whose peak amplitudes varies from an average level by some predetermined amount, are measured to provide a qualitative determination of the performance characteristics of the system.

U.S. Pat. No. 4,872,071 describes a method and apparatus for detecting abnormal operation of a magnetic disk file by reading data from a predetermined area of each track in order to generate a readback signal. The amplitude of these readback signals from each track is compared with the amplitude of that read back from other tracks. If the comparison indicates a predetermined degree of variation, an alarm is given so that corrective action can be taken to avoid an impending head crash.

U.S. Pat. No. 4,841,389 describes a self-diagnostic method and apparatus that dynamically and periodically indicates the likelihood of an impending head crash based upon contemporary readback signal inputs and upon signal overwrite efficiency.

U.S. Pat. No. 4,777,544 describes another method and apparatus of incidental interest which uses the above-mentioned Wallace equation to measure head/disk clearance in situ.

None of these prior art references or any other prior art of which applicants are aware teaches measurement of transducer-to-recording medium clearance or determining transducer instability by sensing the pulse width of a readback signal at a predetermined amplitude level which is a preselected percentage (e.g., 50%) of its base-to-peak amplitude to provide a voltage corresponding to said pulse width at said level, and comparing said voltage to a predetermined prestored reference value. Applicants have found that a substantially linear relationship exists between the pulse width and the transducer-to-medium clearance. For a particular transducer, the slope of a plot of pulse width vs. flyheight/clearance varies according to the amplitude level at which the pulse width is sensed.

There is a need for a method and circuitry that can be applied to existing magnetic recording channel circuitry with minimal expense and without requiring special transducers or read-write circuits (a) to study, from the instantaneous readback signal for diagnostic purposes, the dynamics of the air bearing generated as a transducer flies above the moving storage medium, (b) to indicate magnetic instability of the transducer, and/or (c) to dynamically and periodically indicate the likelihood of an impending crash of a magnetic transducer with a magnetic recording medium.

SUMMARY OF THE INVENTION

A method and circuitry are described for sensing the clearance between a magnetic transducer and a moving magnetic recording medium in a magnetic disk or tape storage system or alternatively sensing the degree of magnetic instability of a magnetic tranducer in such a system. Magnetic transitions prewritten on a preselected area of the medium are read to obtain a readback signal. The width of said signal is sensed at a predetermined amplitude level which is a preselected percentage of its base-to-peak amplitude to provide a voltage corresponding to the width of said signal at said level. The voltage is proportional to the width of the readback signal divided by the time period between successive transitions of identical polarity, so as to provide a measurement of clearance or degree of magnetic instability that is independent of the relative velocity between said transducer and medium.

The voltage is digitized and compared to a prestored digital reference value. If the clearance is not within a preestablished acceptable range, a desired control operation is initiated, such as stopping movement of the medium. The preselected percentage can vary between 10% and 90%. However, when measuring transducer-medium clearance the percentage is preferably 45%-55%; whereas when measuring degree of instability, the percentage is preferably 30%-35%.

DESCRIPTION OF PREFERRED EMBODIMENT

Figure 1:
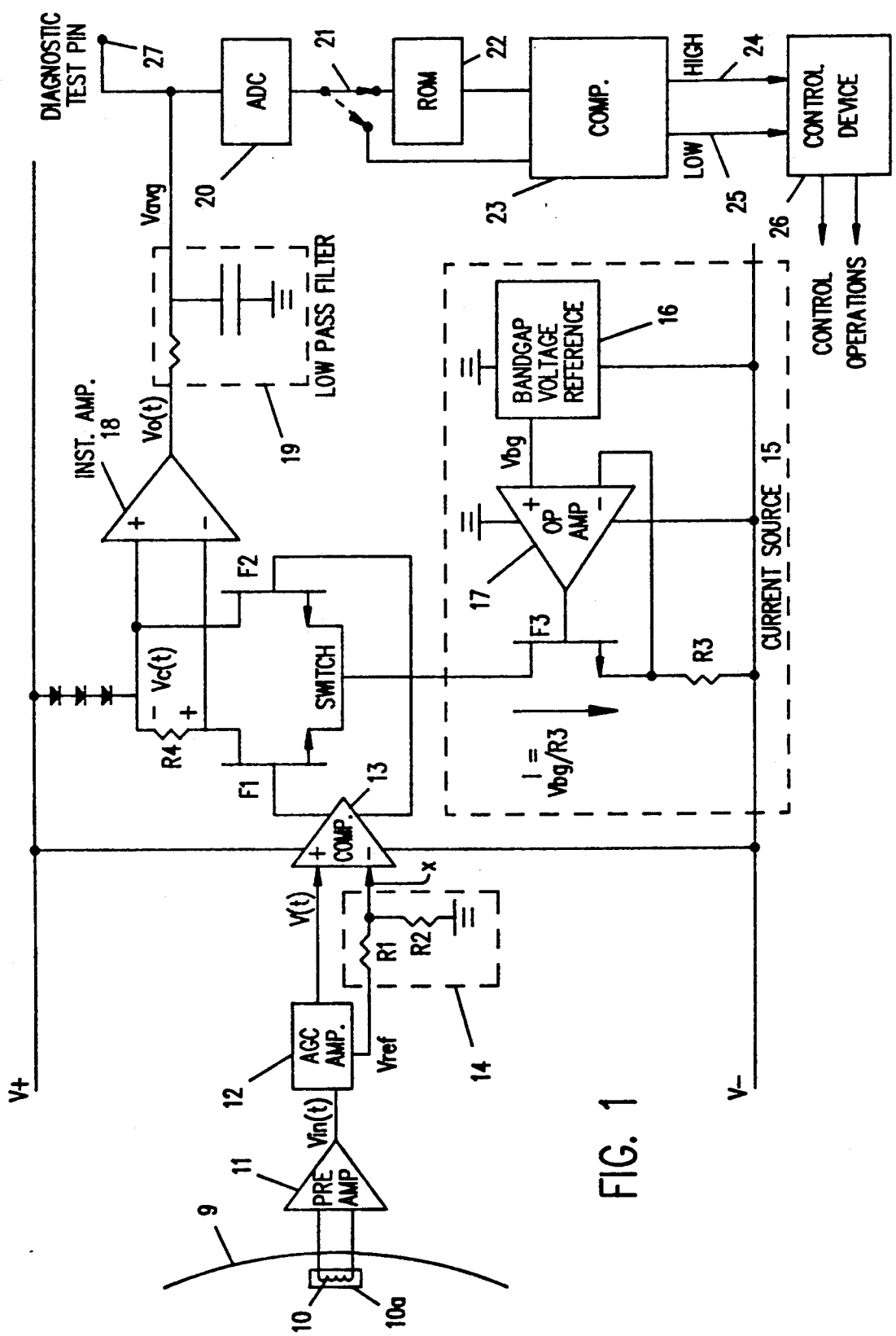
FIG. 1 is a schematic diagram of a data recording channel for a magnetic disk file embodying the invention.

A data channel for a disk file embodying the invention is illustrated in FIG. 1. On rotating magnetic recording disks 9 (only one shown) magnetic data is written and read by magnetic heads 10 (only one shown) carried by an air bearing slider 10a. An input signal Vin(t) read from a magnetic head 10 is transmitted via a preamplifier 11 to an automatic gain control (AGC) amplifier 12 in conventional manner. Head 10, preamplifier 11 and amplifier 12 constitute circuitry components already in a conventional data channel. Amplifier 12 generates a data readback signal V(t) having a base-to-peak amplitude equal to an amplitude reference level voltage Vref. This voltage Vref is created within AGC amplifier 12 by suitable means (not shown), such as a bandgap reference or a zener diode, and is externally available.

Figure 2A:
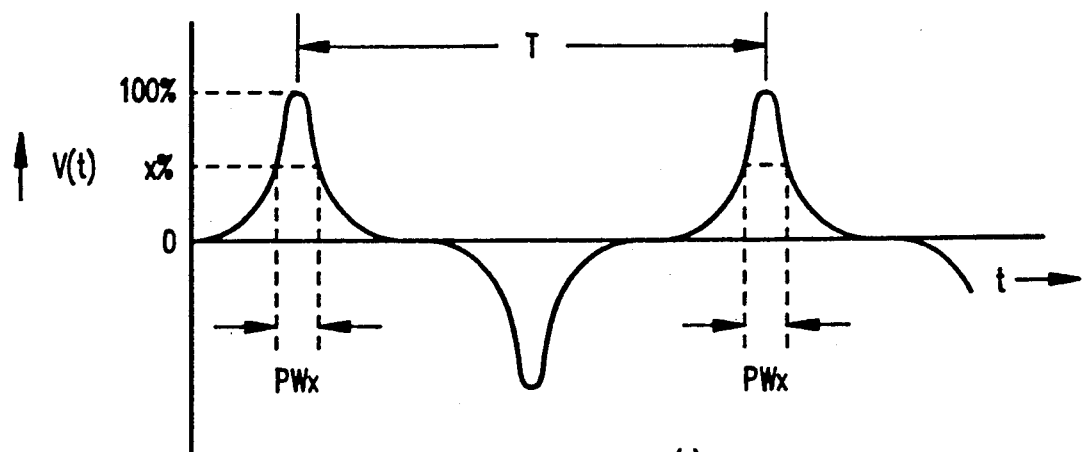
FIGS. 2, 2B and 2C are diagrams depicting signal shapes, respectively, of a data readback signal, of an impulse signal derived from the readback signal, and of a time-averaged signal derived from the impulse signal and used for flyheight/clearance measurement.

According to the invention, data readback signal V(t) from amplifier 12 is applied to the + input of a comparator 13. The amplitude reference level voltage Vref is applied via an attenuator 14 to the − input of comparator 13. Attenuator 14 comprises resistors R1,R2 which operate to reduce the voltage to the − input of comparator 13 to a preselected percentage x of Vref, where x equals R2/R1+R2. The pulse width of signal V(t) at the attenuated voltage level xVref is designated as PWx (see FIG. 2A).

A current source 15 comprises a bandgap voltage reference 16, an operational amplifier 17, resistor R3 and a field effect transistor (FET) F3 which generate a current I.

When data readback signal V(t) exceeds the attenuated voltage xVref, the + output of comparator 13 will go high and simultaneously the − output of the comparator will go low. Current I (which is equal to bandgap reference voltage Vbg divided by resistance R3) will now be directed through FET F1 and develop a voltage IR4 across resistor R4.

When, however, the data readback signal V(t) is lower than the attenuated voltage xVref, the + output of comparator 13 will be low, its − output will be high, and current I will flow through FET F2. The voltage across resistor R4 is then zero. As a result, the voltage across resistor R4 is a pulse wave voltage Vc(t) (see FIG. 2B) with a base-to-peak amplitude IR4, a baseline voltage of zero, and a pulse width PWx equal to the time the data signal V(t) exceeded the attenuated voltage xVref. This pulse wave voltage across resistor R4 is read out as Vo(t) by an instrumentation amplifier 18 in the nature of a differential-to-single ended converter and passed through a low-pass filter 19. Amplifier 18 has a gain of G.

Figure 2B:
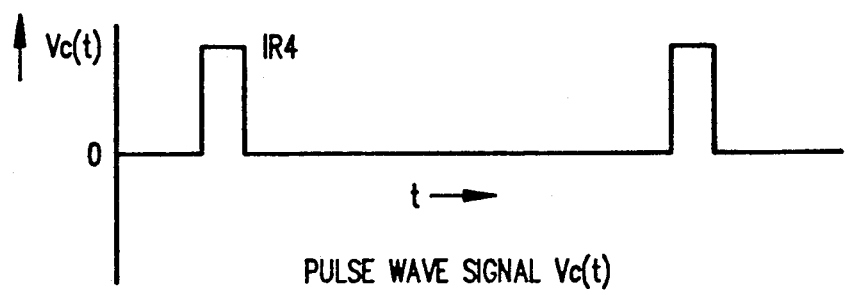
Figure 2C:
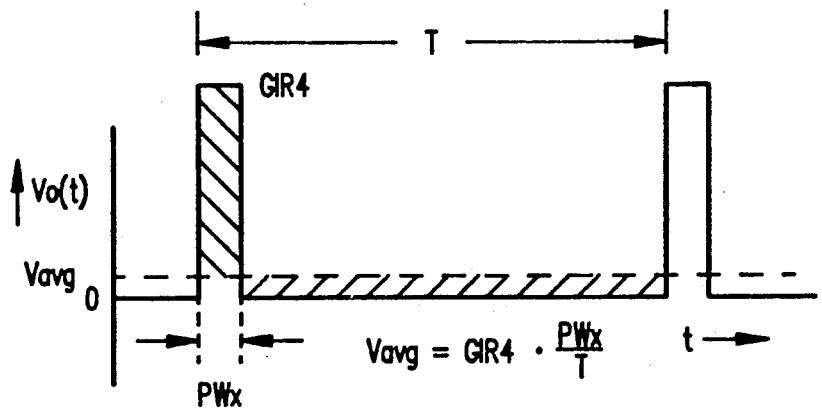

Filter 19 provides a time-averaged output voltage signal Vavg which is a measure of the flyheight/clearance and is arrived at as shown in FIG. 2C. The respective cross-hatched sections above and below Vavg are of equal area, as a result of the low-pass filtering (at 19) of signal Vo(t), as shown in FIG. 2B. This gives $$V_{avg} = \frac{1}{nT} \int_{t}^{t+nT} Vo(t) dt$$

which may also be written as:

$$V_{avg} = GIR4 \cdot \frac{PWx}{T} = S \frac{PWx}{T}$$

where S is the conversion sensitivity.

The pass band is kept below the rotational frequency of the disk (e.g., 0–10 Hz). The instantaneous (instead of time-averaged value) of the voltage signal is arrived at by low-pass filtering (at 19) of signal Vo(t) of FIG. 2B, but making the pass band of the filter much wider (e.g., 0–20 kHz). The circuitry will then also detect the instantaneous variations in PWx along a preselected area of the track. These variations can be caused by liftoff of head 10 by asperities on the disk or other surface defects. The sensitivity is the same as stated above for the time-averaged voltage signal.

This time-averaged analog voltage signal Vavg is digitized by an analog-to-digital converter (ADC) 20. At the time the disk drive is manufactured, a switch 21 is positioned as shown to connect ADC 20 to a ROM 22. Vavg is measured and digitized by ADC 20 to obtain a digitized reference value which is stored in ROM 22.

During operation, switch 21 is positioned as shown in broken lines to bypass ROM 22 and connect ADC 20 directly to one input of a comparator 23. The other input of comparator 23 is connected to ROM 22. If, during operation, the Vavg as measured and digitized exceeds or is less than the digitized reference value previously stored in ROM 22 by more than the limits of a preselected tolerance range, comparator 23 will provide an output in line 24 or line 25, respectively, to cause a control device 26 to initiate an appropriate one of a plurality of control operations.

The control operation may, for example, be stopping disk rotation immediately, or stopping this rotation after first copying all data to another storage device. Or, if it is suspected that the change in clearance is the result of debris collected by the taper of the air-bearing slider 10a, the control operation may be a stop-restart sequence to clean the taper and restore the clearance to within normal limits.

Figure 3:
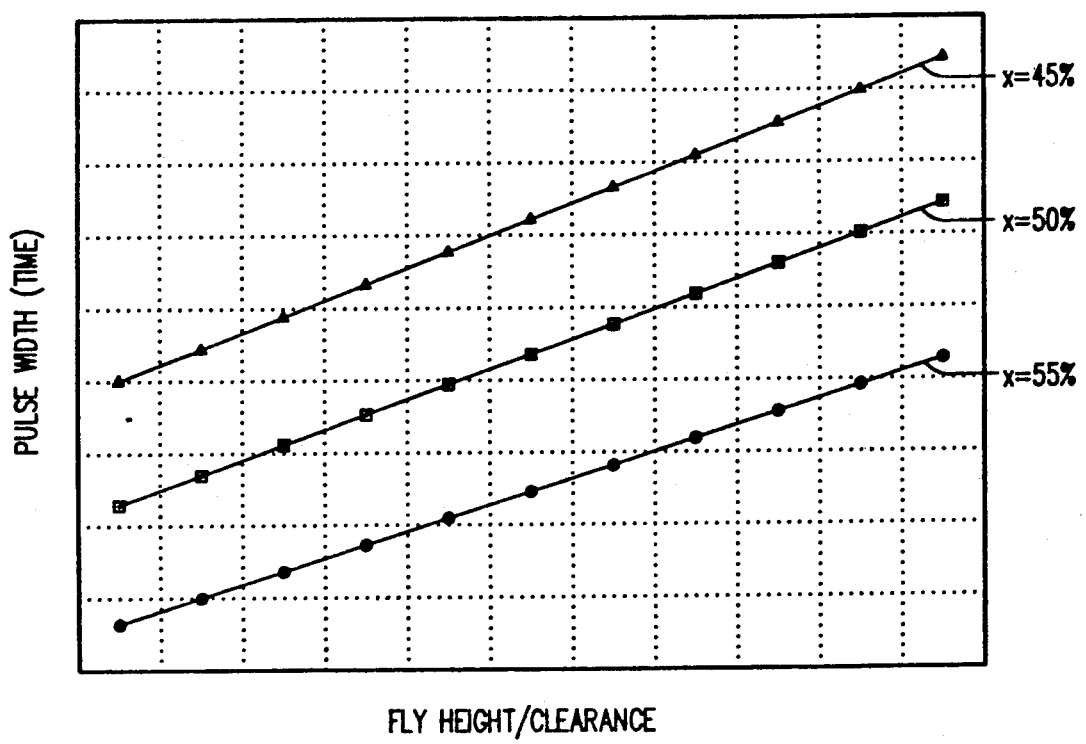
FIG. 3 is a plot of pulse width vs. flyheight/clearance showing the linear relationship between pulse width and flyheight/clearance.

It will now be seen that the method and circuitry embodying the invention measures variations in the shape of the analog readback waveform V(t) as caused by changes in clearance between head 10 and disk 9. Preferably a square wave write current is used at a preselected frequency 1/T, where T is the period of the analog readback waveform V(t) such that V(t) consists essentially of isolated impulses. The frequency 1T of said readback signal should be less than that at which the amplitude of the channel has rolled off to 75% of its low frequency amplitude. The shape of readback signal V(t) is measured using one parameter only; namely, the pulse width PWx at amplitude xVref. As illustrated in FIG. 3 and proved in the section entitled "Proof" below, the relationship between pulse width PWx and the head-to-disk clearance is essentially linear. Since the pulse width PWx is also dependent upon the linear velocity, PWx is divided by the period T of signal V(t) so that the time-averaged signal Vavg is not velocity dependent.

The method and circuitry herein disclosed can also be used to determine the degree to which a recording head 10 or other magnetic transducer is magnetically unstable. This instability occurs because response to the same written data is not consistent for a given read head 10 during consecutive write operations due to magnetic domain effects in the ferromagnetic yoke of said head. After every write operation with a head (and also, but to a lesser extent, while reading data only), the response to a written magnetic transition varies. This makes the equalization in the recording channel (i.e., the filtering to obtain a particular impulse form) difficult. The measured pulse width PWx at a relative amplitude of x % can also vary greatly between write operations. The circuitry herein disclosed can pinpoint this effect, which is shown by some heads to a large extent.

Determination of magnetic instability can be made at the time of manufacture to screen the heads for acceptability or to diagnose acceptability during operation of the magnetic recording medium. When magnetic instability is indicated by the voltage Vavg exceeding the range preset in comparator 23, the circuitry may also be used to shock the head 10 with a dummy write operation to correct its instability. The written data signal for which the clearance and/or instability measurement is taken need not be written over the entire track but may be written only in a sector of the disk track which is not rewritten.

Applicants have found that the value of x can be between 10% and 90%. If x is less than 10%, signal-to-noise ratio will be unacceptable. If x is more than 90%, pulse width PWx is so small that meaningful comparisons with the prestored reference value cannot be made. When measuring flyheight clearance, x is preferably 45–55%; and when measuring magnetic instability of head 10, x is preferably 30–35%.

The method and circuitry herein disclosed can also be used to resolution map the disk by checking variations in PWx along the respective tracks of the flyable zone of the magnetic medium thereby mapping any nonuniformity in the magnetic properties of the magnetic coating.

Since the circuitry above described is integrated as part of the magnetic recording channel, the voltage measurements for clearance and/or instability can be conducted dynamically in situ without requiring external connection to other devices. However, as shown in FIG. 1, the Vavg input to ADC 20 is preferably available at a diagnostic test pin 27, so that the Vavg analog signal can be connected via said pin to an external device for diagnostic purposes.

Proof

Variations in spacing produce a change in spacing which can be represented by a filter with a transfer function:

$$H(f)e^{-2\pi d|f|/v}$$

where d is the head-to-disk clearance, v is the disk velocity, and f is the frequency. The result is a modified frequency spectrum and, consequently, a modified pulse width.

Assume, by way of example, that the pulse width PWx is at half the base-to-peak amplitude level; i.e., x=50%. The relationship between the clearance d and the pulse width can be determined analytically for Lorentzian pulses as follows:

$$V(t) = \frac{V(0)}{1 + \left[\frac{2t}{\tau}\right]^2}$$

where V(0) is the pulse amplitude at t=0, and $\tau$ is the half-amplitude pulse width.

The associated spectrum is:

$$S(f) = \frac{\pi\tau}{2} V(0) e^{-\pi\tau|f|}$$

Applying the above spacing loss filter and the inverse Fourier transform yields:

$$V'(t) = \frac{V'(0)}{1 + \left[\frac{2t}{\tau'}\right]^2}$$

which is again a Lorentzian pulse with an amplitude:

$$V'(0) = \frac{V_o}{1 + \frac{2d}{\tau_o v}}$$

and width:

$$\tau' = \tau_o + \frac{-2d}{v}$$

where Vo and $\tau_o$ are the parameter values when contacting the medium (d=0).

The voltage signal (for clearance or instability) as measured by the method herein described is therefore:

$$V_{avg} = S \frac{\tau_o + \frac{2d}{v}}{T} = S\left(\frac{\tau_o}{T} + \frac{2d}{\lambda}\right)$$

where $\tau_o$ is the half-amplitude pulse width upon contact, $\lambda$ is the written wavelength and d is the head-disk clearance. $\lambda$ and $$\frac{\tau_o}{T}$$

are constant for a prewritten signal; i.e., independent of the disk velocity.

For an isolated readback pulse shape consisting of a linear combination of Lorentzian pulses, it can be calculated (and has been illustrated in FIG. 3) that there is a virtually linear relationship between pulse width PWx and clearance d. For other pulse shapes that cannot be built up of Lorentzian pulses, a good linear relationship was found between pulse width and clearance.

It should be noted that the invention has herein been described as implemented in a disk drive; but it is equally applicable to a tape drive, and hence the term "moving magnetic recording medium" should be construed herein and in the claims as including a tape drive as well as a disk drive.

Also, while the invention has been shown and described with respect to a preferred embodiment thereof, it will be understood by those skilled in the art that changes in form and detail may be made in this embodiment for either disk drive or tape drive use, without departing from the scope and teaching of the invention. Accordingly, the method and circuitry herein disclosed are to be considered merely as illustrative, and the invention is to be limited only as specified in the claims.

We claim:

1. A method for sensing the clearance between a magnetic transducer and a moving magnetic recording medium in a magnetic storage system, comprising the steps of:
   writing magnetic transitions on a preselected area of the medium;
   reading the transitions from said area in order to obtain a readback signal;
   sensing the width of said readback signal at a predetermined amplitude level which is a preselected percentage of its base-to-peak amplitude to provide a voltage corresponding to the width of said signal at said level; and
   using said voltage to measure said clearance.

2. The method of claim 1, wherein said voltage is proportional to the width of said readback signal divided by the time period between successive transitions of identical polarity, thereby to provide a measurement of clearance that is independent of the relative velocity between said transducer and medium.

3. The method of claim 1, including, during the using step, comparing said voltage to a predetermined reference value to determine whether the clearance lies within a preestablished acceptable range.

4. The method of claim 3, including the steps of:
   storing said reference value at the time of manufacture in a memory; and
   initiating a desired control operation when the comparing step indicates that said voltage is not within said preestablished acceptable range.

5. The method of claim 3, wherein the desired control operation involves stopping movement of the medium to prevent an impending crash of the transducer with the medium.

6. The method of claim 3, wherein the desired control operation involves performing a corrective operation to clean debris from an assembly on which the transducer is mounted.

7. The method of claim 1, wherein said percentage is from 10% to 90%.

8. The method of claim 1, wherein said percentage is between about 45% and 55% when measuring flyheight/clearance between the transducer and medium.

9. The method of claim 1, wherein said preselected area is normally not rewritten during operation.

10. The method of claim 1, wherein the transitions are written as equidistant identical transitions.

11. A method for sensing magnetic instability of a magnetic transducer with respect to a moving magnetic recording medium in a magnetic storage system, comprising the steps of:
   writing magnetic transitions on a preselected area of the medium;
   reading the transitions from said area in order to obtain a readback signal;
   sensing the width of said readback signal at a predetermined amplitude level which is a preselected percentage of its base-to-peak amplitude to provide a voltage corresponding to the width of said signal at said level; and
   using said voltage to measure the degree of instability of said transducer.

12. The method of claim 11, wherein said voltage is proportional to the width of said readback signal divided by the time period between successive transitions of identical polarity, thereby to provide a measurement of instability that is independent of the relative velocity between said transducer and medium.

13. The method of claim 11, including, during the using step, comparing said voltage to a predetermined reference value to determine whether the instability lies within a preestablished acceptable range.

14. The method of claim 11, wherein said percentage is between about 30% and 35%.

15. The method of claim 11, including the step, when transducer instability is indicated by the voltage exceeding said range, of shocking the transducer with a dummy write operation in an attempt to restore it to stability.

16. A magnetic storage system, comprising:
   a movable magnetic recording medium;
   a magnetic transducer for reading, during movement of the medium, magnetic transitions prewritten on a preselected area of the medium in order to obtain a readback signal;
   means for sensing the width of said readback signal at a predetermined amplitude level which is a preselected percentage of its base-to-peak amplitude to provide a voltage corresponding to the width of said signal at said level; and
   means responsive to said voltage to denote the clearance between said transducer and the moving medium.

17. The storage system of claim 16, including means for conditioning said readback signal to provide a measurement of clearance that is independent of the relative velocity between said transducer and medium.

18. The storage system of claim 16, wherein said voltage responsive means includes means for comparing said voltage to a predetermined reference value to determine whether the clearance lies within a preestablished acceptable range.

19. The storage system of claim 16, including:
   a memory for storing said reference value at the time of manufacture; and
   means for initiating a desired control operation when said comparing means indicates that said voltage is not within said preestablished acceptable range.

20. The storage system of claim 16, wherein said percentage is from 10% to 90%.

21. The storage system of claim 16, wherein said percentage is between about 45% and 55%.

22. A magnetic storage device having a data channel, comprising:
   a movable magnetic storage medium;
   magnetic transducer means for writing a signal comprising magnetic transitions in a data band on the medium at a frequency less than that at which the amplitude of the channel has rolled off to 75% of its low frequency amplitude;
   means for reading back the signal from the recorded transitions;
   means for generating a voltage proportional to the width of said readback signal at a preselected amplitude level that is between 10% and 90% of its peak-to-base amplitude;
   means for comparing said voltage to a predetermined previously stored reference value generated for said preselected amplitude level and providing an output when said voltage varies from a prescribed acceptable range; and
   means responsive to said output to initiate a desired control operation.

23. The storage device of claim 22, characterized in that said storage medium is a magnetic disk and said transitions comprise changeable customer data, and said readback signal is obtained for an entire track of the disk, and said comparing means compares said voltage against said predetermined reference value over a predetermined period of time.

24. A disk file comprising, in combination:
a rotatable magnetic recording disk;
a magnetic transducer supported to fly with clearance above the disk during rotation of the latter, while reading magnetic transitions from a track on the disk to generate an analog readback signal;
means for sensing the width of said readback signal at a predetermined amplitude level which is a preselected percentage of its base-to-peak amplitude to provide a voltage corresponding to the width of said signal;
means for converting said voltage to a digitized value; and
means for comparing said digitized value to a predetermined digital reference value to determine whether the clearance lies within a preestablished acceptable range.

25. The disk file of claim 24, including means for adjusting said percentage to between 10% and 90%.

26. The disk file of claim 24, including means for setting said percentage at between about 45% and 55% to measure flyheight clearance between the transducer and disk.

27. The disk file of claim 24, including
means for storing said reference value in digital form at the time of manufacture; and
means for initiating a control operation when said comparing means indicates that said digitized value is not within said acceptable range.

28. A magnetic storage device comprising, in combination:
a rotatable magnetic recording disk;
a magnetic transducer for reading magnetic transitions from a track on the disk to generate an analog readback signal;
means for sensing the width of said readback signal at a predetermined amplitude level which is a preselected percentage of its base-to-peak amplitude to provide a voltage corresponding to the width of said signal at said level;
means for converting said voltage to a digitized value; and
means for comparing said digitized value to a predetermined digital reference value to measure the degree of instability of the transducer.

* * * * *